Patented Feb. 12, 1946

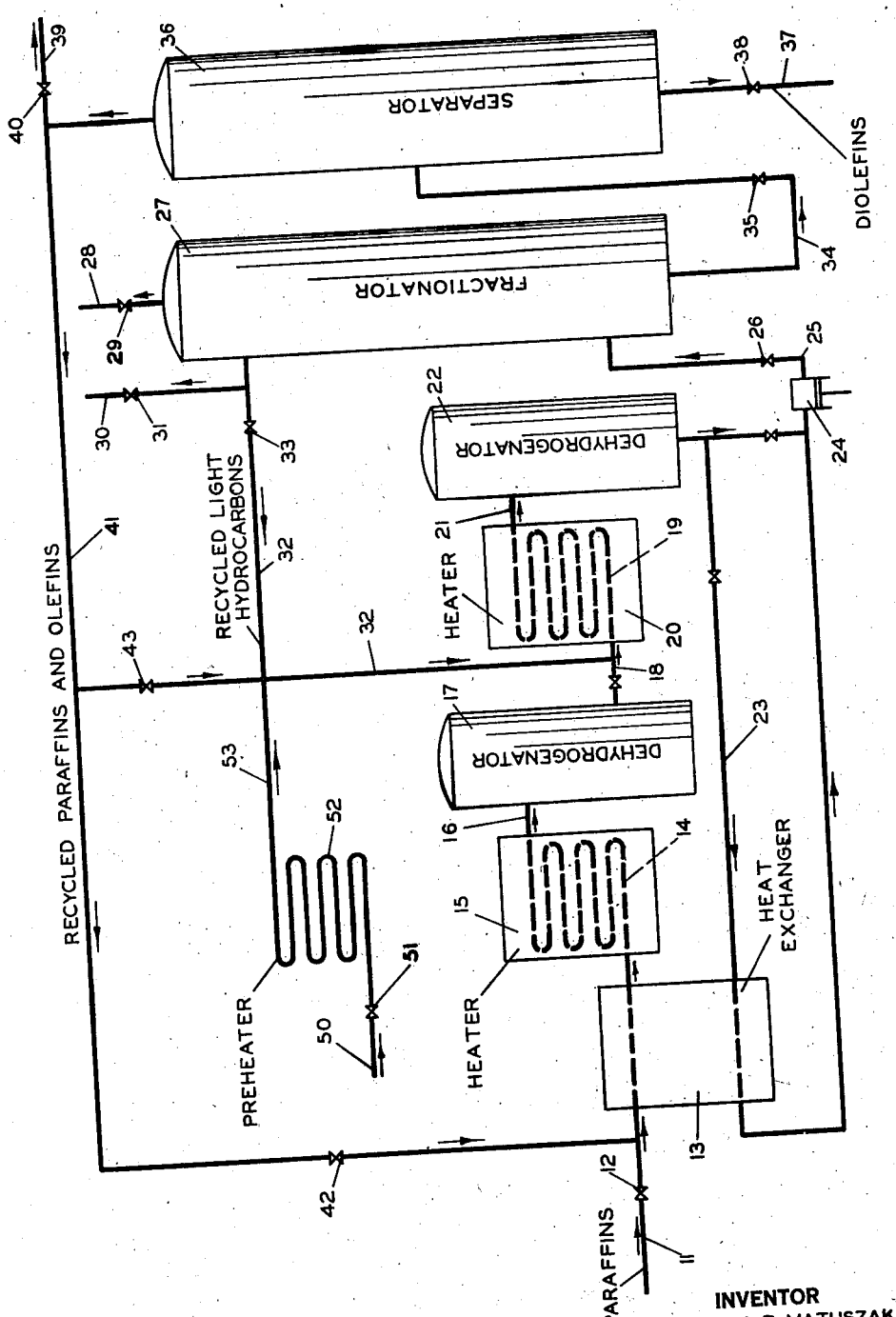

2,394,625

UNITED STATES PATENT OFFICE 2,394,625

PROCESS FOR PRODUCING DIOLEFINS

Maryan P. Matuszak, Bartlesville, Okla., assignor to Phillips Petroleum Company, a corporation of Delaware Application September 11, 1941, Serial No. 410,479

5 Claims. (Cl. 260—680)

This invention relates to a process for producing diolefins, and more particularly to the production of diolefins from paraffins by catalytic dehydrogenation. This application is a continuation-in-part of my copending application, Serial No. 354,132, filed August 24, 1940, Patent No. 2,378,651, issued June 19, 1945.

Extensive experimentation in the field of catalytic dehydrogenation has demonstrated that dehydrogenation of hydrocarbons is subject to a number of determining factors or limitations. Noteworthy among these is the thermodynamic limit of the extent to which the dehydrogenation can occur under any particular set of reaction conditions, for the dehydrogenation can not proceed beyond the maximum possible at equilibrium. As the equilibrium is influenced by the reaction conditions, the extent of dehydrogenation is somewhat controllable by selection of the reaction conditions. In general, as is well known, the extent of dehydrogenation at equilibrium is increased by an increase in temperature and by a decrease in pressure. However, in practice, these well-known expedients may be of relatively little value because of the operation of other factors, which may prevent the establishment of an equilibrium or prevent the close approach of equilibrium conditions from one direction or another.

Another noteworthy limitation of dehydrogenation of hydrocarbons is that imposed by the simultaneous occurrence of side reactions. Among these side reactions are polymerization and cracking or splitting of carbon-to-carbon bonds. Cracking is undesirable because it produces a loss of reactant material to relatively light hydrocarbons and to carbon or coke that is deposited on the catalyst, whereby the catalyst is deactivated and must be subjected to revivification. Polymerization is undesirable in part for substantially the same reason, for it produces relatively heavy hydrocarbons that have a comparatively high susceptibility to cracking; in addition, it produces a loss of reactant material to undesired heavy hydrocarbons. As these reactions are undergone relatively easily by diolefins, they constitute a factor of considerable importance in the practical production of diolefins by catalytic dehydrogenation.

Still another noteworthy limitation is that imposed by the properties of known dehydrogenation catalysts. These properties, which may vary widely for different catalysts, effectively limit the use of any particular catalyst to a fairly definite temperature range characteristic of the catalyst. Below this temperature range, the dehydrogenation proceeds to a negligible or unprofitable extent. Above this temperature range, the dehydrogenation is masked or overwhelmed by reactions resulting in undesired by-products and in excessive deposition of carbon upon the catalyst.

Although other determining factors or limitations of dehydrogenation of hydrocarbons exist, the three mentioned are probably the most important insofar as production of diolefins is concerned. These limitations are naturally somewhat interdependent, and the dehydrogenation of any particular hydrocarbon presents a specific problem in the solution of which these limitations must be considered both severally and jointly in order that optimum conditions of dehydrogenation may be selected.

These various limitations operate strongly against single-stage dehydrogenation of paraffins to diolefins. Although some production of diolefins by single-stage dehydrogenation of paraffins is possible, the catalyst must be so active, the temperature so elevated, and the rate of throughput so low that excessive formation of cracking by-products and carbon results, thereby rendering the process inefficient and impractical.

Because of these limitations, in the past, production of diolefins from paraffins by catalytic dehydrogenation has been usually by the following multiplicity of steps: the paraffins are partly converted to the corresponding olefins and other products in a first step; the resulting olefins are isolated or concentrated in a second step; the isolated olefins are partly dehydrogenated to diolefins in a third step, usually at a partial pressure of a fraction of an atmosphere that is obtained either by operating at a subatmospheric pressure or by diluting the olefins with an inert diluent such as nitrogen or steam; and the resulting diolefins are separated or concentrated in a fourth step. In the second of these four steps, the olefins are freed substantially completely from free hydrogen, as the presence of free hydrogen in the next or third step, in which dehydrogenation to diolefins is effected, is generally considered undesirable on thermodynamic grounds. Because this olefin isolation step must be generally effected at a relatively low temperature, whereas each of the contiguous steps requires a highly elevated temperature, the presence of this step in the process entails a great expense for cooling and heating.

One object of this invention is to effect a catalytic dehydrogenation of more saturated hydrocarbons to form less saturated hydrocarbons.

An object of this invention is to produce diolefins from paraffins.

Another object of this invention is to dehydrogenate paraffins to diolefins without an intermediate step for the concentration of olefins or for the removal of free hydrogen.

Other objects and advantages of the invention will be apparent to those skilled in the art of catalytic dehydrogenation of hydrocarbons from the accompanying disclosure and discussion.

The present invention is characterized by an advantageous combination of catalytic materials and dehydrogenation conditions wherewith efficient production of diolefins from paraffins is effected without excessive formation of carbon and cracking by-products and without an intermediate step for concentration of olefins and removal of free hydrogen. In one specific embodiment, the present invention comprises production of diolefins from paraffins by subjecting the paraffins at a relatively low dehydrogenation temperature to the action of a highly active dehydrogenation catalyst, preferably of the type of those that comprise black chromium oxide, and then subjecting the resulting mixture at a relatively high dehydrogenation temperature to the action of a dehydrogenation catalyst, preferably of the type of those that comprise green chromic oxide and that are free from black chromium oxide, which has a minimum activity for promoting cracking and/or polymerization reactions.

The accompanying drawing is a schematic flow diagram for one preferred mode of procedure for this specific embodiment of the invention, which may be described in detail.

A paraffin feed stock comprising one or more paraffins capable of being dehydrogenated to diolefins, preferably paraffins with four to five carbon atoms per molecule, enters the system by inlet 11 having valve 12. To it may be added recycled paraffins and olefins as hereinafter detailed. It is heated somewhat in heat exchanger 13 and then further to an elevated temperature in coil 14, which is heated by heater 15. This elevated temperature sometimes may be as high as about 1100° F., but it should not be so high that extensive non-catalytic dehydrogenation or cracking occurs. Minor amounts of olefins may be present in such a feed stock, and diluents may, in some cases, also be included. Such diluents include nitrogen, flue gas, steam, free hydrogen, methane, etc.

The heated paraffin feed stock passes through conduit 16 into catalytic dehydrogenator 17, which contains a highly active or low-temperature dehydrogenation catalyst maintained at a suitable dehydrogenation temperature. In this dehydrogenator a low-temperature dehydrogenation of paraffins to olefins is effected without substantial formation of diolefins or other compounds that tend to undergo polymerization and/or cracking at the prevailing temperature.

For this low-temperature dehydrogenation, the catalyst should be capable of effecting a conversion of at least 15 per cent of a dehydrogenatable paraffin having four or five carbon atoms per molecule to the corresponding olefin or olefins at a pressure of one atmosphere, at a temperature of 850° F., and at a space velocity of at least 1000 volumes of gaseous hydrocarbon (at room temperature) per volume of catalyst per hour. The most advantageous catalysts of this type are those comprising dark green or black chromium oxide obtained by non-spontaneous thermal decomposition of chromium compounds, such as hydrated chromic oxide, ammonium-containing salts of chromic acid, and the like. Nonspontaneous thermal decomposition is effected without the occurrence of a spontaneous glowing or incandescence, which betokens a transition of the dark, unglowed chromium oxide into the relatively inactive, glowed green chromic oxide. The dark or unglowed chromium oxide may be intimately associated with a difficultly reducible oxide, as in gels prepared by dehydration of an intimate mixture of chromium hydroxide with one or more of the hydrous oxides of such elements as aluminum, zirconium, magnesium, thorium, silicon, titanium, boron, and the like. In such mixed-oxide catalysts, the proportions of black chromium oxide and of the other oxide or oxides may vary, but usually an equimolecular amount of the chromium oxide and of one difficultly reducible oxide is to be prefered, although in some cases as little as about 5% of chromium oxide may be present, and in other cases chromium oxide associated with as little as about 5% of another oxide, such as alumina, will have advantageous properties.

The reaction conditions in dehydrogenator 17 may vary considerably. The pressure may be as high as several atmospheres, but it is preferably about one atmosphere. The temperature may be between about 750 and 1000° F.; a temperature range of 850 to 950° F. is preferred, as in it the catalyst effects dehydrogenation to the best advantage, without excessive formation of cracking by-products and carbon. The space velocity may be about 500 to 3000 volumes of gaseous hydrocarbon (at room temperature) per volume of catalyst per hour; a space velocity of 1500 to 2500 volumes per volume per hour is preferred. In general, the conditions may be advantageously so selected that from 15 to 30 per cent of the paraffins react, forming principally the corresponding olefins, and such that a minimum of reactions involving scission of carbon to carbon bonds occurs.

The conditions selected naturally influence the exact composition of the material effluent from dehydrogenator 17; by way of illustration, in the dehydrogenation of normal butane in the preferred temperature range of 850 to 950° F., the composition of the effluent material may be within the following approximate limits, in per cent by gas volume:

| | |
|---|---|
| Hydrogen | 17-28 |
| Butylenes | 13-19 |
| Light hydrocarbons | 1.5-3.5 |
| Heavy hydrocarbons | 0.2-0.8 |
| Unreacted butane | 68-49 |

When recycling is practiced, the composition of the effluent is somewhat improved in that a relatively higher content of olefins is established; however, for best results in a subsequent dehydrogenation step, which is to be described directly, the concentration of olefins in the material charged to this second step should not exceed about 40 mol per cent, and it preferably should be between 20 and 30 mol per cent.

Effluent material from dehydrogenator 17 is directly passed to a second dehydrogenation without an intermediate step for the separation of one or more constituents from the others. Thus, an unseparated portion proceeds by conduit 18 into coil 19, in which it is raised to a second elevated temperature by heat supplied by heater 20. This second elevated temperature is preferably high enough to be capable of effecting some thermal decomposition of the paraffins, but more than slight thermal decomposition of paraffins is avoided by sufficiently rapid passage of the heated material through conduit 21 into catalytic dehydrogenator 22; at times the temperature may be as high as about 1300° F., but usually it is preferably about 1200° F.

In dehydrogenator 22, the heated material, which comprises paraffins, olefins, hydrogen, and by-product hydrocarbons, is subjected to a high-temperature catalytic dehydrogenation that is equivalent to dehydrogenation of up to about a third of the olefins to diolefins. This dehydrogenation must be made at a temperature considerably higher than that prevailing in dehydrogenator 17 in order to favor the formation of diolefins from the olefins and to discourage the formation of polymers, which would result in a considerable loss of diolefins to cracking by-products and carbon. The temperature should be in the range of about 1050 to 1300° F., and preferably in the range of 1100 to 1200° F., in which best results appear to be obtainable.

Because of the high temperature essential for practical yields of diolefins, the catalyst in dehydrogenator 22 must be much less active, especially as regards promotion of polymerization and splitting of carbon to carbon bonds at such high temperature, than that in dehydrogenator 17. In consequence, it preferably should be substantially completely free from black chromium oxide, which is so active at the temperature prevailing in dehydrogenator 22 that it becomes quickly deactivated by deposition of carbon. Among suitable catalysts are granular alumina and dehydrated bauxite. These catalysts are appreciably improved by the addition of metallic oxides that themselves possess some catalytic activity for dehydrogenation of hydrocarbons, such as the oxides of zirconium, vanadium, molybdenum, uranium, tungsten, zinc, and the like.

An especially efficacious and advantageous catalytic ingredient for use in the high-temperature dehydrogenation is green chromic oxide or chromium sesquioxide, which may be formed by thermal decomposition of many chromium compounds. For example, this oxide may be incorporated in an alumina or a bauxite catalyst by impregnating the catalyst with a solution of a soluble chromium compound and then igniting the resulting impregnated catalyst to convert the chromium compound to chromium sesquioxide. For use in this manner, chromic acid and chromium salts of organic acids, such as formic acid, acetic acid, and the like are preferred because of their relatively low decomposition temperature; but other salts, such as the nitrate, may be used. Alternatively, chromic hydroxide may be precipitated from an aqueous solution onto the alumina or the bauxite by an alkaline precipitant, such as ammonia or an alkali hydroxide or carbonate, and then the resulting mixture may be ignited to convert the chromic hydroxide into green chromic oxide, the glowing phenomenon taking place. If desired, porous carriers such as silica gel, kieselguhr, charcoal, and the like may be used instead of alumina or bauxite, but alumina and bauxite appear to be superior to such carriers for use with green chromic oxide.

Green chromic oxide or chromium sesquioxide by itself constitutes an advantageous catalyst for use in the second or high-temperature dehydrogenation step, such as that represented in the flow-diagram by dehydrogenator 22. It may be prepared in an exceedingly voluminous and surface-rich form by heating an ammonium chromate to its spontaneous decomposition temperature, at which the ammonium chromate decomposes with explosive violence. Ammonium chromate, ammonium dichromate, or ammonium trichromate may be used to prepare the catalyst in this manner. However, green chromic oxide prepared in this manner suffers from a lack of mechanical strength, so that the initial tea-leaf-like aggregates become readily disintegrated into an impalpable powder through handling. Hence, the green chromic oxide should be first briquetted into relatively compact particles or granules. Suitably granular catalysts may be also obtained by heating granular catalysts comprising black chromium oxide under conditions that effect substantially complete conversion of the black chromium oxide to green chromic oxide without excessive disruption of the original granules. Catalysts that through long-continued use and repeated rivivification under drastic conditions of temperature and rate of revivification become too weak for advantageous service in the first or low-temperature dehydrogenation step may be advantageously converted in this manner into catalysts suitable for the second or high-temperature dehydrogenation step.

Gel-type catalysts comprising one or more other metallic oxides as well as black chromium oxide may be made suitable for use in the high-temperature dehydrogenation by converting the black chromium oxide to green chromic oxide. Preferred metallic-oxide constituents of such converted gel-type catalysts are difficultly reducible oxides, such as the oxides of aluminum, zirconium, titanium, silicon, thorium, boron, and magnesium. Some readily reducible metallic oxides, such as those of thallium, bismuth, lead, and mercury, may also be present in minor proportions in the gel-type catalyst. The metallic oxides are preferably incorporated into the gel-type catalyst while both they and the chromium oxide are in a highly hydrous condition, as by coprecipitation from a suitable aqueous solution, preferably of the nitrates, or by mixing together the severally precipitated hydrous oxides, preferably while the precipitated hydrous oxides are still fresh and unaged.

The conversion of dark or black, unglowed chromium oxide, by itself or associated with one or more other metallic oxides, into green chromic oxide is usually readily effected by heating to a temperature of the order of 1500° F. For some preparations, the temperature of transition from the dark unglowed chromium oxide into the green chromic oxide may be much below 1500° F., perhaps even below 1100° F.; for others, a temperature above 1500° F. may be required. The heating of a preparation to convert unglowed chromium oxide into green chromic oxide preferably should be effected relatively slowly, to avoid excessive disruption of the granules by escaping moisture and/or oxygen. During the transition, the chemical composition of the chromium oxide appears to change from that representable by the formula $CrO_2$ to that represented by $Cr_2O_3$.

The catalyst used for the second or high-temperature dehydrogenation step advantageously may be improved by impregnating it with a metallic compound that on being heated to an elevated temperature yields a nonvolatile residue containing an element selected from the alkali and the alkaline earth metals. The amount of the nonvolatile residue may vary from a trace to about 6 per cent of the original catalyst; a preferred amount is between 0.2 and 2 per cent. Such impregnating material comprising one or more of the alkali or alkaline earth metals is beneficial by modifying the catalyst so that the catalyst has a decreased tendency to cause polymerization and to undergo deactivation. In consequence of this effect, the temperature of the second dehydrogenation step advantageously may be somewhat increased, thereby increasing the rate and/or the extent of dehydrogenation, and also favoring the production of diolefins.

From dehydrogenator 22, the reaction mixture is passed by conduit 23 to heat exchanger 13, in which it loses much of its heat to the incoming stream of paraffins that enters the system by inlet 11. From the heat exchanger, the reaction mixture is forced, as by compressor 24, through conduit 25 having valve 26, into fractionator 27. In this fractionator the mixture is freed from relatively low-boiling by-products of the dehydrogenation. Hydrogen, usually accompanied by some of the light hydrocarbons having fewer carbon atoms than the paraffins entering the system by inlet 11, is withdrawn from fractionator 27 by outlet 28 having valve 29. The light hydrocarbons not withdrawn with the hydrogen may be withdrawn as one or more separate fractions, as by outlet 30 having valve 31; however, these light hydrocarbons are preferably recycled, at least in part, as by conduit 32 having valve 33 to coil 19 and thence to dehydrogenator 22, since the light paraffins act as diluents and the light olefins act as hydrogen acceptors, whereby these light hydrocarbons advantageously promote the dehydrogenation to diolefins.

The reaction mixture, after being freed from relatively low-boiling by-products of the dehydrogenation, is passed by conduit 34 having valve 35 into separator 36, in which the diolefins are separated or concentrated. These diolefins are then withdrawn through outlet 37 having valve 38 as a product of the process. The other hydrocarbons may be withdrawn partly or totally from the system, as through outlet 39 having valve 40; but they are preferably recycled through conduit 41 to one or both of the two dehydrogenation steps, in proportions controlled by valves 42 and 43.

In some instances a hydrocarbon-containing mixture similar in composition to that produced in the first dehydrogenation step, or similar in composition to the mixture resulting from adding to such product a recycle stream from conduit 32, may be available from a source outside the process. In such a case this material may be introduced to the process through conduit 50 controlled by a valve 51, and through preheater 52 and conduit 53 to conduits 32 and 18. In other instances such a charge may be the sole charge to the process, in which case the dehydrogenation step involving dehydrogenator 17 will operate, in the manner disclosed, only on material recycled through conduit 41 and valve 42. Such a material charged through conduit 50 may be a C₄ and lighter fraction from a cracking still which has a low or negligible iso-C₄ content.

It is to be understood that the drawing is schematic only and that the practice of my invention will include many pieces of conventional equipment not shown or referred to in detail. Such equipment will include heaters, coolers, absorbers, strippers, fractional distillation columns and associated equipment, pumps, compressors, heat exchangers, catalyst chambers, etc., known to those skilled in the art. The general flow of materials, operating conditions of the major and essential steps, materials to be used and treated, products to be desired, and effects of varying operating conditions have been disclosed and discussed in a manner to be effective and sufficient guides for one skilled in the art. In the light of this disclosure and discussion, specific optimum conditions and equipment in connection with any particular modification or practice of my invention may be readily ascertained and supplied.

The step represented schematically by separator 36 may comprise any of a number of known diolefin-concentrating steps. For example, it may involve concentration by absorption with suitable solvents and/or reagents that preferentially combine with the diolefin and that may be made to liberate the diolefin by such simple means as heating, evacuation, or the like. A sometimes advantageous separation step comprises adsorption of the diolefin with a highly active and selective adsorbent such as dehydrated chromium oxide gel, from which the absorbed diolefin may be recovered by heating, steam distillation, evacuation, or the like.

By the practice of the present invention, a paraffin capable of being dehydrogenated to one or more diolefins, is first catalytically dehydrogenated to the corresponding olefin, at a temperature too low to produce a concentration of diolefins capable of deactivating the catalyst at an excessive rate by polymerizing and cracking; then the resulting olefin, advantageously diluted by the unreacted paraffin and the by-products of the first dehydrogenation step, is catalytically dehydrogenated to the diolefin by a relatively less active and less readily deactivated catalyst at a temperature too high for excessive polymerization. By this procedure, a desirable extent of conversion of the initial paraffin to diolefin products is obtained without excessive destruction to cracking by-products and carbon and without the expense of an intermediate step for the concentration of the olefin and/or for the removal of hydrogen.

*Example I*

Normal butane is dehydrogenated at a space velocity of about 1500 to 2500 volumes per volume of catalyst per hour and at a temperature of about 850 to 950° F. with a granular catalyst consisting predominantly of black chromium oxide prepared by the nonspontaneous thermal decomposition of ammonium chromate. The resulting mixture is subjected to further dehydrogenation at a somewhat lower space velocity of about 800 to 1200 with a granular catalyst consisting predominantly of green chromic oxide at a temperature of about 1100 to 1200° F. Hydrogen and light hydrocarbons are removed by fractional distillation, and butadiene is recovered from the resulting residue in good yield by absorption with a cuprous salt, followed by heating to break up the resulting butadiene-cuprous salt complex. The yield is appreciably increased by recycling the unreacted butane and butenes; it is also appreciably increased by recycling light hydrocarbons to the second dehydrogenation step.

*Example II*

Isopentane is treated in substantially the same manner as the normal butane of Example I, except that the catalyst in the first dehydrogenation step is a gel consisting of equimolecular amounts of intimately associated alumina and black chromium oxide and the catalyst in the second dehydrogenation step is granular alumina impregnated with green chromic oxide to the extent of about 15 per cent by weight. Isoprene, mixed with a minor proportion of piperylene, is obtained in good yield.

Example III

Normal pentane is treated in substantially the same manner as the normal butane of Example I, except that the catalyst in the first dehydrogenation step is a gel consisting of equimolecular amounts of coprecipitated zirconia and black chromium oxide and the catalyst in the second dehydrogenation step is bauxite impregnated with about 0.5 per cent by weight of potassium chromate. Piperylene, mixed with a minor proportion of isoprene, is obtained in good yield.

Because the invention may be practiced otherwise than as specifically described or illustrated, and because many modifications and variations within the spirit and scope of it will be obvious to those skilled in the art of catalytic dehydrogenation, the invention should not be unduly restricted by the foregoing description and illustrative examples.

What is claimed is:

1. A process for the manufacture of a conjugated diolefin of not more than five carbon atoms per molecule from the corresponding paraffin which comprises passing the paraffin into contact with an active chromium oxide dehydrogenation catalyst under conditions such that dehydrogenation of the paraffin to the corresponding olefin is the principal reaction, passing the total effluent of the first dehydrogenation step into contact with a chromium oxide catalyst having lower catalytic activity than that of the first mentioned dehydrogenation catalyst under conditions such that dehydrogenation of butenes to butadiene is the principal reaction, separating from the effluent of the second dehydrogenation step a recycle stream comprising paraffins and olefins having fewer carbon atoms per molecule than said corresponding olefins, and recycling said stream to the second dehydrogenation step in admixture with the effluent of the first dehydrogenation step.

2. A process for the manufacture of conjugated diolefins of four to five carbon atoms per molecule from the corresponding paraffin which comprises passing the paraffin at a temperature in the range of 850 to 950° F. into contact with a gel catalyst consisting of approximately equimolecular amounts of alumina and dark unglowed chromium oxide effecting dehydrogenation of the paraffin to the corresponding olefin as the principal reaction, passing the total effluent of the first dehydrogenation step at a temperature in the range of 1100–1200° F. into contact with a catalyst consisting of granular alumina impregnated with about 15 percent by weight of green chromic oxide effecting dehydrogenation of said corresponding olefin to the diolefin as the principal reaction, separating from the effluent of the second dehydrogenation step a recycle stream comprising paraffins and olefins having fewer carbon atoms per molecule than said corresponding olefins, and recycling said stream the second dehydrogenation step in admixture with the effluent of the first dehydrogenation step.

3. A process for the manufacture of butadiene from butane which comprises passing butane to a first catalytic dehydrogenation zone into contact with an active chromium oxide dehydrogenation catalyst at a temperature within the range of 850 to 950° F. under dehydrogenating conditions such that dehydrogenation of butane to butenes is the principal reaction which takes place, passing the total effluent of said first dehydrogenation to a second catalytic dehydrogenation zone at a temperature in the range of 1050 to 1300° F. into contact with a chromium oxide dehydrogenation catalyst having lower catalytic activity than that of said first mentioned catalyst under dehydrogenation conditions such that dehydrogenation of butenes to butadiene is the principal reaction, separating $C_2$ and $C_3$ hydrocarbons from the effluent of said second dehydrogenation and passing said hydrocarbons to said second dehydrogenation in admixture with the effluent of said first dehydrogenation, and recovering from the effluent of said second dehydrogenation a fraction containing the butadiene so produced.

4. In a process for the manufacture of conjugated diolefins of four to five carbon atoms per molecule from the corresponding paraffin in which said paraffin is dehydrogenated to corresponding olefins in a first dehydrogenation step in the presence of a chromium oxide dehydrogenation catalyst and in which said corresponding olefins are dehydrogenated to the diolefin in a second dehydrogenation step in the presence of a chromium oxide catalyst less active than that of the first step, the improvement which comprises admixing with the total effluent from the first dehydrogenation step paraffins and olefins having fewer carbon atoms than said corresponding paraffin to such extent that the concentration of said corresponding olefin in the resulting mixture is between 20 and 30 mol percent, and passing the resulting mixture to the second dehydrogenation step as the charge therefor.

5. A process for the manufacture of butadiene from butane which comprises passing the butane into contact with a chromium oxide dehydrogenation catalyst comprising dark unglowed chromium oxide in a first dehydrogenation step under conditions such that dehydrogenation of butane to butenes is the principal reaction whereupon the activity of the catalyst is gradually reduced, passing the total effluent of the first dehydrogenation step into contact with a chromium oxide catalyst less active than that of the first dehydrogenation step and comprising green chromic oxide under conditions such that dehydrogenation of butenes to butadiene is the principal reaction, said dehydrogenation catalyst in said second dehydrogenation step consisting of catalytic material previously used in said first dehydrogenation step, separating from the effluent of the second dehydrogenation step a recycle stream comprising paraffins and olefins having two to three carbon atoms per molecule, and recycling said stream to the second dehydrogenation step in admixture with the effluent from the first dehydrogenation step.

MARYAN P. MATUSZAK.